United States Patent [19]

Cabahug

[11] Patent Number: 5,800,108
[45] Date of Patent: Sep. 1, 1998

[54] APPARATUS FOR RAPIDLY ENGAGING AND DISENGAGING THREADED COUPLING MEMBERS

[75] Inventor: Eric F. Cabahug, Falls Church, Va.

[73] Assignee: Thread Technology, Inc., Sterling, Va.

[21] Appl. No.: 731,003

[22] Filed: Oct. 9, 1996

[51] Int. Cl.$^6$ .................... F16B 37/08; F16B 39/36
[52] U.S. Cl. .................... 411/433; 411/267; 285/34
[58] Field of Search .................... 411/432, 433, 411/267; 285/34, 316

[56] References Cited

U.S. PATENT DOCUMENTS

| | | | |
|---|---|---|---|
| 1,006,190 | 10/1911 | Estell | 411/433 |
| 2,021,051 | 11/1935 | Desbrueres . | |
| 2,896,496 | 7/1959 | Jansen . | |
| 3,157,215 | 11/1964 | Zahodiakin . | |
| 3,352,341 | 11/1967 | Schertz . | |
| 3,695,139 | 10/1972 | Howe . | |
| 3,870,332 | 3/1975 | Eaton . | |
| 4,083,393 | 4/1978 | Okada . | |
| 4,172,606 | 10/1979 | Howe . | |
| 4,378,187 | 3/1983 | Fullerton . | |
| 4,871,282 | 10/1989 | Jennings | 411/433 |
| 4,974,888 | 12/1990 | Childers . | |
| 5,081,811 | 1/1992 | Sasaki . | |
| 5,100,275 | 3/1992 | Schirrmacher . | |
| 5,118,237 | 6/1992 | Wright . | |
| 5,139,381 | 8/1992 | Lubreski et al. . | |
| 5,324,150 | 6/1994 | Fullerton . | |
| 5,378,100 | 1/1995 | Fullerton . | |
| 5,427,488 | 6/1995 | Fullerton et al. . | |
| 5,613,816 | 3/1997 | Cabahug . | |

FOREIGN PATENT DOCUMENTS

| | | | |
|---|---|---|---|
| 1013342 | 7/1952 | France | 411/433 |
| 1249213 | 8/1986 | Russian Federation | 411/433 |
| 558302 | 12/1943 | United Kingdom | 411/433 |

Primary Examiner—Flemming Saether
Attorney, Agent, or Firm—Staas & Halsey

[57] ABSTRACT

A coupling device having a first member provided with threads, a second member having an opening into and out of which the first member is inserted and removed, threaded elements within the second member mounted for movement between a first position where the first member may be threaded with the second member and a second position where the threaded elements have a diameter larger than the diameter of the threads of the first member permitting the first member to slide axially in and out of the second member, pull/lock/torque pins associated with the threaded elements and a manually operable mechanism for moving the threaded elements longitudinally into engagement with the pins expanding the threaded elements to their second position. The second member including an outer body provided with oval openings through which the pull/lock/ torque pins pass and the threaded elements may include oval indentations against which the ends of the pull/lock pins abut, and wherein the threaded elements may include shoulders against which the pull/lock/torque pins abut.

12 Claims, 2 Drawing Sheets sleeve 18 and which pass through the outer body 16 through
APPARATUS FOR RAPIDLY ENGAGING AND DISENGAGING THREADED COUPLING MEMBERS

BACKGROUND AND SUMMARY OF THE INVENTION

The present invention relates to a coupling device featuring threaded members capable of rapid engagement and disengagement.

Threaded coupling devices, such as nuts and bolts, have often proven ineffective in highly specialized applications, including by way of example where speed is required and where rotating movement is undesirable. In the coupling devices which are the subject of U.S. Pat. Nos. 4,378,187, 5,324,150, 5,378,100 and 5,427,488, for example, there are disclosed various threaded fasteners featuring radially inwardly biased arcuate segments mounted to engage the threads of a bolt or other threaded member. The threaded segments are movably mounted within a casing and are resiliently urged inwardly. Typically the casing is provided with axially spaced apart radially inwardly directed surfaces of revolution, such as frustoconical surfaces, extending at a common acute angle to the axis of the fastener. In this manner the fasteners and couplings may be secured by merely pushing the nut into the bolt by rectilinear movement, afterwhich final tightening is accomplished by a small amount of rotation.

Such coupling devices may be constructed to be both engaged and disengaged by rapid rectilinear movement. In such case, the bolt is inserted within the nut by rectilinear sliding movement for a predetermined distance, afterwhich it is rotated into tight engagement with the nut. Release of the bolt may be accomplished simply by rotating same slightly in the opposite direction, afterwhich simple sliding movement of the bolt withdraws the threaded elements of same from engagement permitting the bolt to be slidably removed axially from the nut.

In Applicants' application Ser. No. 08/489,158, filed Jun. 9, 1995, rapid engagement and disengagement along the rectilinear axis is accomplished with the coupling members, there being featured pin assemblies movably fitted within adjacent V-shaped segments of the movably mounted externally threaded elements, such that as the coupling members are moved relative to each other the pin assemblies force the threaded elements apart. In addition, ball assemblies are employed enhancing the locking action of the component parts while ensuring proper alignment thereof.

In the present invention, the outer body of the coupling device is provided with oval openings through which pull/lock pins pass, while the threaded elements include oval indentations against which the ends of the pins abut, thus locking the threaded elements when the sleeve associated with the outer body is moved. The pull/lock pins penetrate the outer body and the threaded segment with very little side clearance, thus permitting the pull/lock pins to move axially when the sleeve is pulled back. The lower portion of the oval in the threaded segment does not penetrate through the face of the thread, such that when the sleeve is down, the pins abut the ledges and lock the threads into place. The ends of the pull/lock/torque pins prevent the threaded segments from moving backwardly. This simplified locking mechanism eliminates the need for the locking ball assembly of Applicants' earlier filed application. Still further, as the sleeve is pulled upwardly the pull/lock/torque pins clear the ledge since the oval penetrates the thread face and the threaded segments are free to move. Continued pulling back of the sleeve causes the thread segments to engage the top cap ramp thereby directing the threaded segments back and away. As the threaded segments are moved backwardly, the pull/lock/torque pins pass through the opening in the threaded segments permitting the threaded segments to move.

Still further, when the sleeve is positioned downwardly, the sleeve or handle attached to the outer body or the outer body itself, can be rotated. The resulting torque force is transmitted to the pull/lock/torque pins and thus to the threaded segments. This feature eliminates the need for torque pins or bosses placed on the top cap or outer body as in previous constructions, and other patents. Furthermore, the force of the sleeve spring on the threaded segments permits the elimination of the circumferential garter spring.

DESCRIPTION OF THE PREFERRED EMBODIMENT

Figure 1:
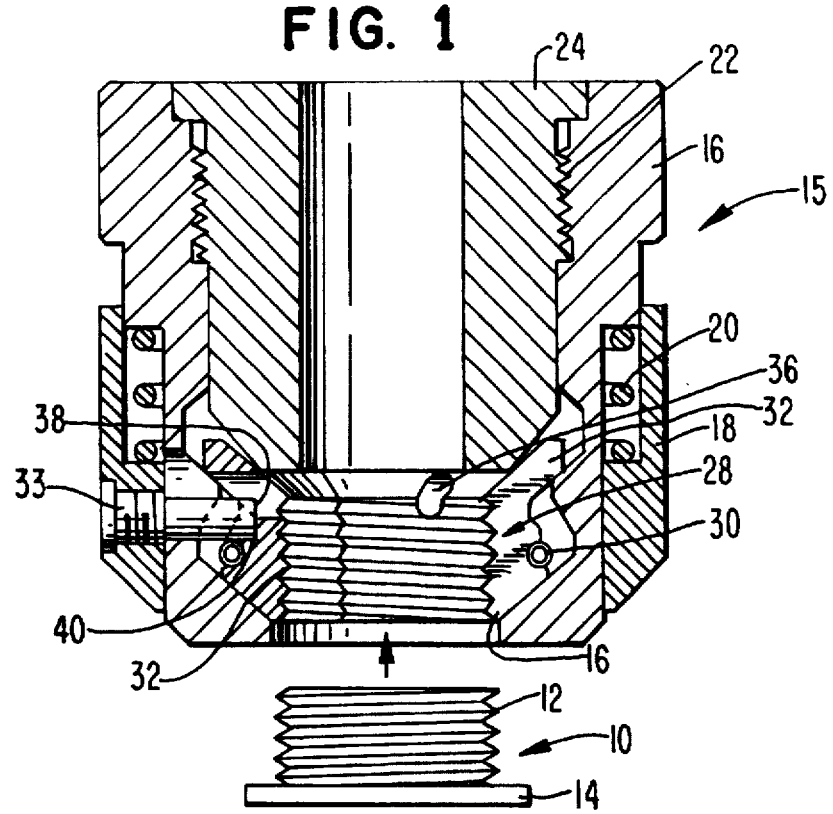
FIG. 1 is a sectional view of the coupling device illustrating the position of the parts before the externally threaded member is inserted therein.
Figure 2:
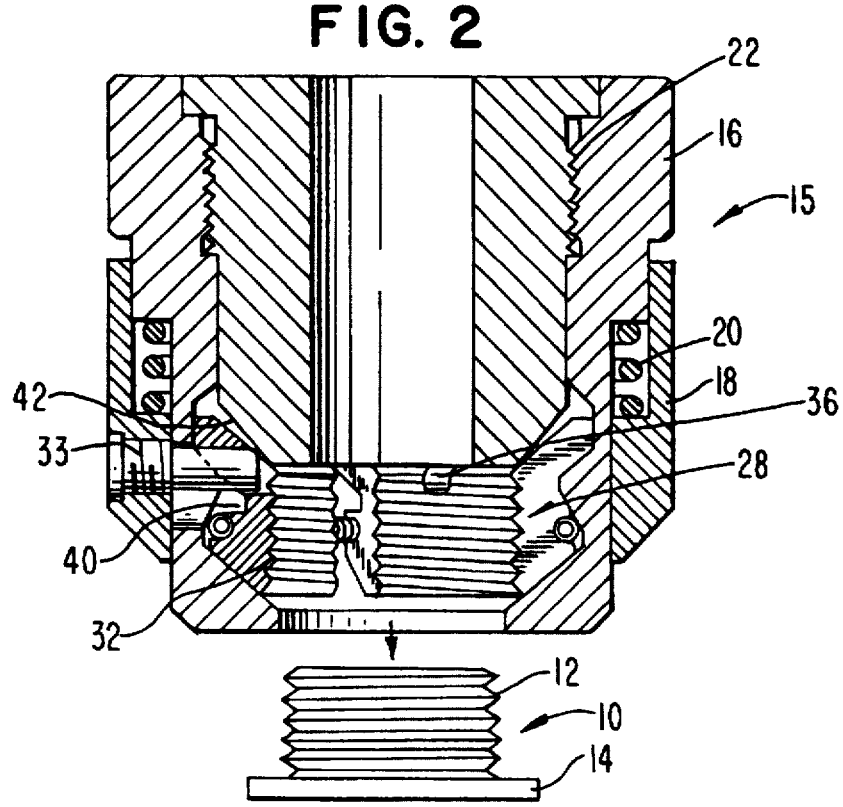
FIG. 2 is a sectional view of the coupling device with the sleeve raised.
Figure 3:
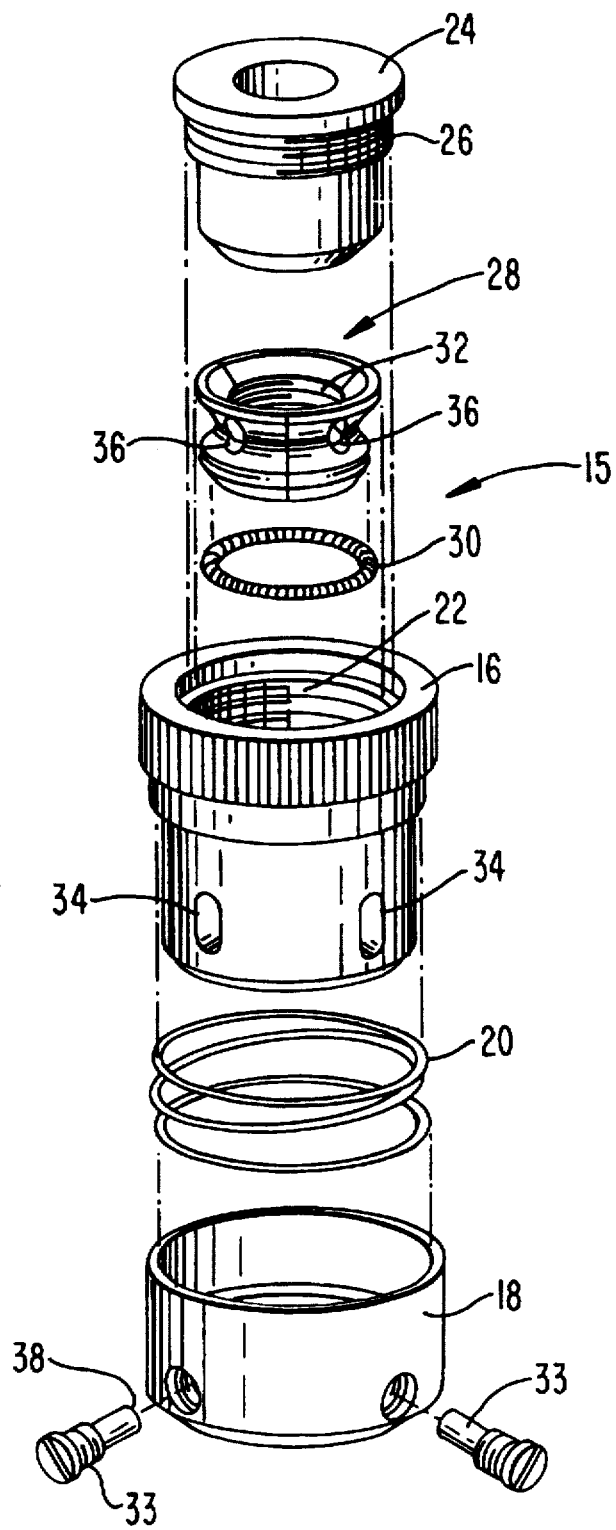
FIG. 3 is an exploded perspective view illustrating the components of the coupling device.

As seen in FIGS. 1–3, the coupling device of the present invention includes a first member 10 which in the preferred embodiment is a bolt provided with helically positioned threads 12 and a head 14, and a second member 15 having an outer body 16 into which the first member 10 may be inserted in locking relationship.

The second member 15 includes an outer body 16 surrounded by a sleeve 18, between which is located a compression spring 20. The inner surface of the outer body 16 is provided with threads 22 and the top cap 24 is similarly provided with threads 26, thus enabling the top cap 24 to be screwed in place within the outer body 16.

The reference numeral 28 generally designates a plurality of movably mounted, externally threaded elements which are positioned within the lower cavity of the outer body 16. The movably mounted threaded elements 28, which in the preferred embodiment are three in number, are surrounded and urged together with a garter spring 30, as seen in FIG. 3. The movably mounted threaded elements 28 are each provided with internal threads 32 which are complimentary in configuration to the threads 12 of the first member 10.

Figure 4:
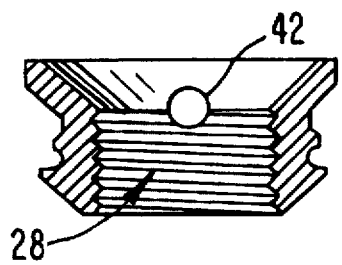
FIG. 4 is a sectional view of the coupling device without the locking feature.

The reference numeral 33 generally designates a plurality of pull/lock/torque pins which are fastened by threads to the the openings 34 (FIG. 3) and 42 (FIG. 4). Only a small amount of clearance is provided between the pins 33 and the openings 34 and 42, such that the pull/lock/torque pins 33 move smoothly in an axial direction when the sleeve 18 is moved backwardly, as explained hereinafter.

In the first embodiment, each of the threaded segments 28 is provided with an oval indentation 36. Thus, when the sleeve 18 is in its lowermost position, the pull/lock/torque pins 33 abut and lock the threaded elements 28 in place. The pull/lock/torque pins 33 do not pass through the threaded segments 28 since the oval indentations 36 are not openings passing through the threaded segments 28 but are only indented surfaces against which the pull/lock/torque pins 33 abut. In the position illustrated in FIG. 1, it will be apparent that the end 38 of the pin 33 engages the shoulder 40 of the threaded segment 28 preventing same from moving backwardly. This simplified locking mechanism eliminates the need for locking balls and related structure. As the sleeve 18 is moved upwardly to the position illustrated in FIG. 2, the ends 38 of the pull/lock/torque pins 32 clear or pass above the ledge or shoulder 40 and are free to pass through the opening.

The second embodiment in FIG. 4 eliminates the locking feature with the oval indentations 36 and simply has a round opening 42 in the threaded segment larger than the pull/lock/torque pins 33 that allows the pull/lock/torque pins to pass through the threaded segment.

Continued movement of the sleeve 18 causes the pull/lock pins 33 to contact the top portions of the openings 36 or 42 in the threaded segments 28. Activating the pins 33 at this point rather than at the bottom of the threaded elements 41 provides additional design opportunities. Movement of the sleeve 18 causes the pull/lock/torque pins 33 to lift the threaded segments 28 causing same to press against the conical surfaces 42 of the top cap 24 thereby forcing the threaded segments 28 outwardly in a radial direction. At this time, the first member 10 may be inserted. Releasing the sleeve 18 moves the threaded segments 28 downwardly forcibly engaging and locking with the external threads 12.

From the foregoing, it will be apparent that the interaction between the pull/lock/torque pins 33 and the openings 36 and 42 eliminates the need for structure such as the pin assemblies and V-shaped segments in Applicants' co-pending application, noted above, and if desired, the circumferential garter spring. Moreover, it is not necessary to have the sleeve 18 extend to the front of the assembly since the locking function performed by the pins 33 and openings 36 and 42 acts at points spaced inwardly from the end of the assembly. Still further, the sleeve 18 in its lowermost position, or a handle (hex or other feature) attached to the outer body 16, can be rotated. The resulting torque force is transmitted to the pins 33 and thus to the threaded segments 28 by the pins 33. This eliminates the need for torque pins or bosses positioned on the top cap 24 as has been sometimes done in the past.

I claim:

1. A coupling device comprising:

a first member provided with threads;

a second member having an opening into and out of which said first member may be inserted and removed, respectively;

an outer body having sides, frustoconical internal surfaces and oval openings on the sides;

threaded elements within said second member with frustoconical surfaces matching the frustoconical internal surfaces of the outer body and which are mounted for movement between a first position wherein the first member may be threaded within the second member and the second position wherein the threaded elements have a diameter larger than the diameter of the threads of the first member permitting the first member to slide axially in and out of the second member, as desired;

pull/lock/torque pins passing through the oval openings in the outer body which are associated with the threaded elements, the pull/lock/torque pins terminating in ends;

a sleeve mounted for movement upwardly and downwardly, and a manually operable mechanism associated therewith with the pull/lock/torque pins attached thereto which cause the pins to apply an axial force to the threaded elements moving the pins into engagement with the threaded elements; and wherein the threaded elements include oval indentations against which the ends of the pull/lock/torque pins abut locking the threaded elements in place when the sleeve is down.

2. A coupling device as in claim 1, wherein said pull/lock/torque pins act longitudinally on the threaded elements above the openings expanding the threaded elements to the second position, aforesaid.

3. A coupling device as in claim 1, wherein said pull/lock/torque pins act longitudinally on the threaded elements above the openings expanding the threaded elements to the second position, aforesaid.

4. A coupling device as in claim 1, wherein said manually operable mechanism and sleeve move along the outer body, the pull/lock/torque pins passing through the outer body, and a spring interposed between the sleeve and the outer body forcing the sleeve and pull/lock/torque pins against the threaded elements forcing same back into engagement.

5. A coupling device as in claim 1, wherein said manually operable mechanism and sleeve move along the outer body, the pull/lock/torque pins passing through the outer body, and a spring interposed between the sleeve and the outer body forcing the sleeve and pull/lock/torque pins against the threaded elements forcing same back into engagement.

6. A coupling device as in claim 1, wherein the pull/lock/torque pins include means for transferring torque from the outer body directly to the threaded elements.

7. A coupling device as in claim 1, wherein the pull/lock/torque pins include means for transferring torque from the sleeve directly to the threaded elements.

8. A coupling device as in claim 1, wherein the pull/lock/torque pins include means for transferring torque from the sleeve or outer body directly to the threaded elements.

9. A coupling device comprising:

a first member provided with threads;

a second member having an opening into and out of which said first member may be inserted and removed, respectively;

said second member including an outer body and a sleeve;

threaded elements within said outer body and mounted for movement between a first position wherein the first member may be threaded within the second member and a second position wherein the threaded elements have a diameter larger than the diameter of the threads of the first member permitting the first member to slide axially in and out of the second member, as desired;

pull/lock/torque pins attached to the second member and associated with the threaded elements, the pull, lock/torque pins terminating in ends;

the outer body being provided with oval openings through which the pull/lock/torque pins pass;

the threaded elements including surfaces against which the ends of the pull/lock/torque pins abut locking the threaded elements in place when the sleeve is down, such that as the outer body is moved relative to the sleeve the threaded elements are moved longitudinally into engagement with the pins expanding the threaded elements to their second position, aforesaid; and wherein the surfaces of the threaded elements comprise oval indentations against which the ends of the pull/lock/torque pins abut.

10. A coupling device as in claim 9, wherein the surfaces of the threaded elements comprise oval indentations against which the ends of the pull/lock/torque pins abut.

11. A coupling device comprising:

a first member provided with threads;

a second member having an opening into and out of which said first member may be inserted and removed, respectively;

said second member including an outer body and a sleeve;

threaded elements within said outer body and mounted for movement between a first position wherein the first member may be threaded within the second member and a second position wherein the threaded elements have a diameter larger than the diameter of the threads of the first member permitting the first member to slide axially in and out of the second member, as desired;

pull/lock/torque pins attached to the second member and associated with the threaded elements, the pull, lock/torque pins terminating in ends;

the outer body being provided with oval openings through which the pull/lock/torque pins pass;

the threaded elements including surfaces against which the ends of the pull/lock/torque pins abut locking the threaded elements in place when the sleeve is down, such that as the outer body is moved relative to the sleeve the threaded elements are moved longitudinally into engagement with the pins expanding the threaded elements to their second position, aforesaid; and wherein the surfaces of the threaded elements include openings through which the ends of the pull/lock/torque pins pass.

12. A coupling device as in claim 11, further comprising a spring interposed between the sleeve and the outer body forcing the sleeve and pull/lock/torque pins against the threaded segments forcing same into engagement.

* * * * *